Sept. 25, 1962   R. B. WILLIAMSON ET AL   3,055,455
CAR RETARDERS FOR RAILROADS

Filed Jan. 18, 1960   2 Sheets-Sheet 1

INVENTORS.
R. B. WILLIAMSON AND
I. A. DE KRAMER
BY *Forest B. Hitchcock*
THEIR ATTORNEY Sept. 25, 1962  R. B. WILLIAMSON ET AL  3,055,455
CAR RETARDERS FOR RAILROADS
Filed Jan. 18, 1960 2 Sheets-Sheet 2
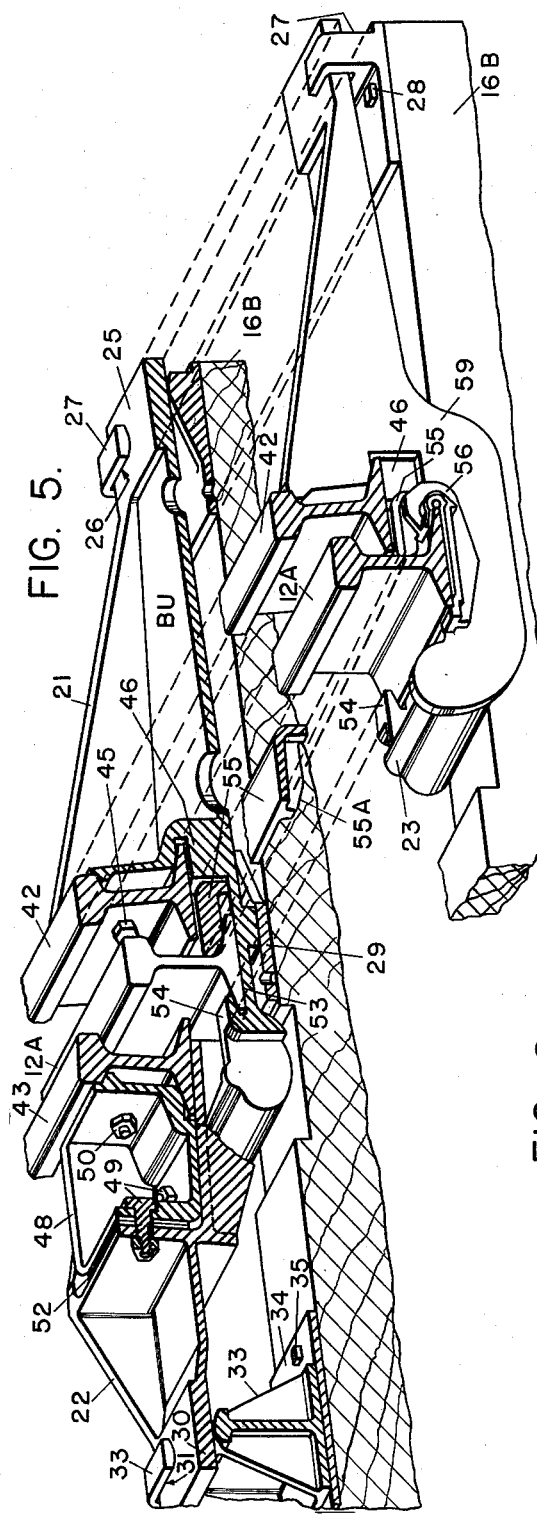
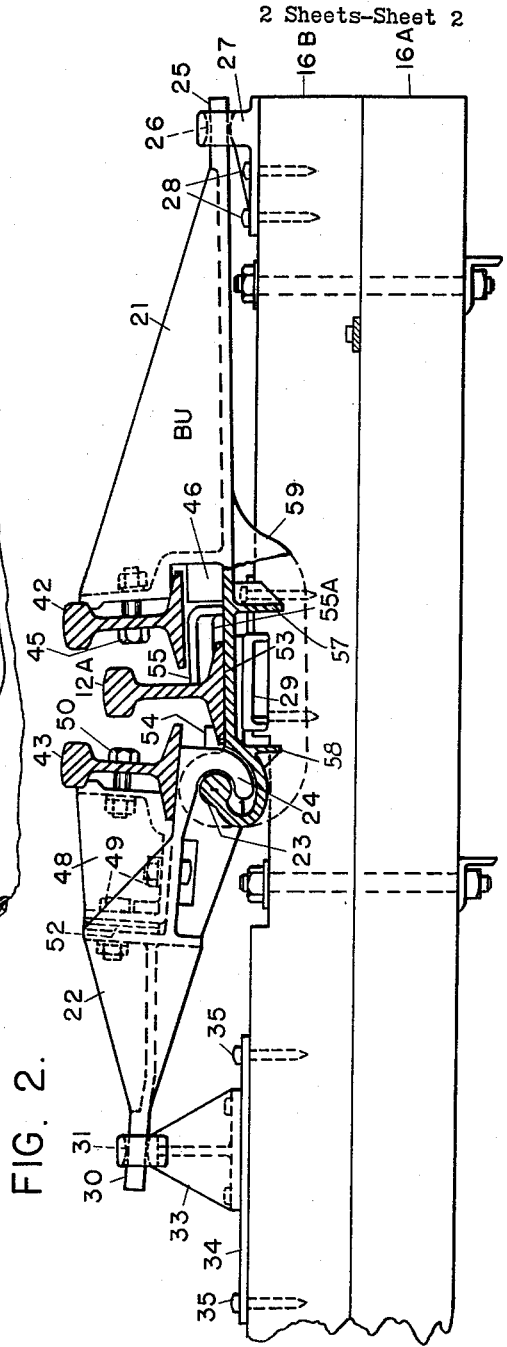
INVENTORS.
R.B. WILLIAMSON AND
I.A. DE KRAMER
BY
THEIR ATTORNEY United States Patent Office 3,055,455
Patented Sept. 25, 1962

3,055,455
CAR RETARDERS FOR RAILROADS
Robert B. Williamson and Isaac A. De Kramer, Rochester, N.Y., assignors to General Railway Signal Company, Rochester, N.Y.
Filed Jan. 18, 1960, Ser. No. 3,047
9 Claims. (Cl. 188—62)

This invention relates to car retarders of the track brake type, and more particularly relates to car retarders of the inert type which utilize the weight of the car in the actuation of its mechanism.

This application is a continuation-in-part of our prior pending application Ser. No. 857,941 filed December 7, 1959.

There are conditions in railway classification yards and the like where it is desirable to use a car retarder to stop and hold a car for an indefinite length of time. One condition where a car retarder of the inert type is desirable for such use is at the end of a classification yard where the first car entering a specified track is stopped and held so that other cars may be stopped thereby until the desired number of cars are accumulated.

Track skates have been used for this purpose, such methods necessitating the services of attendants who are required to remove such track skates before the cars can be pulled out of the end of the yard by a locomotive, thus causing considerable expense and loss of time to train crews.

The present invention contemplates the use of an inert car retarder for stopping and holding the cars until such time as it is desired to remove them by a locomotive which may be either manually or remotely controlled. As there would never be more than one or two cars of the train passing through the retarder at the same time the locomotive could easily overcome the holding effect of the car retarder brake shoes.

Generally speaking, the car retarder of the present invention is provided with brake shoes which are supported on a succession of articulated toggle lever beam units which rest on the tie bed with one brake shoe located on each side of the running rail which is also supported by the lever beam units. Each articulated toggle lever beam unit comprises two lever arms which are pivotally interlocked by ball and socket hook joints at their inner ends and bear on fixed supporting brackets at their outer ends. Each lever arm supports one brake shoe in a manner whereby they may cooperate with the car wheels passing therethrough on the running rail. The running rail is supported solely on the outer lever arm.

In its normal position, the pivotally interlocked portion of the articulated lever beam unit is in a so called collapsed position and rests on the tie bed. With the two brake shoes thus positioned with a minimum distance therebetween, the car retarder is positioned to receive average cars, the wheels of which have a width greater than the spacing between the brake shoes. Thus, as the first car wheel enters the car retarder, the brake shoes are separated, causing the articulated toggle lever beam units and the associated running rail to rise above its supporting tie bed as permitted by the articulated ball and socket hook joint connection of the inner ends of the lever arms. However, with the weight of the car now on the running rail, the rail and its associated lever beam units are forced downward towards the tie bed, causing the brake shoes to bear against both sides of the wheels. Thus, maximum braking is provided in accordance with the weight of the car to stop and hold the car or cars securely within the retarder.

As previously mentioned, the car retarder mechanism of the present invention is associated with only one of the running rails and the mounting is such that the toggle lever beam units are permitted to move transversely with respect to the direction of the rail and car travel. The running rail itself is sectional and each section extends from the center of one lever beam unit to the center of the next lever beam unit.

The main object of the present invention is the manner in which the sections of the running rail are anchored to the lever beam units, each rail section being anchored at its ends to its adjacent lever beam unit by means of wedges and rail anchors which securely hold the car retarder sections together in articulated fashion and also prevent transverse and endwise movement of the rails.

Other objects, purposes and characteristic features of the present invention will be partly apparent and partly pointed out as the detailed description progresses. In describing the invention in detail reference will be made to the accompanying drawings wherein the various parts will be referred to by distinctive reference characters and wherein:

FIG. 2 is an end sectional view as taken on the line 2—2 of FIG. 1 and shows one of the articulated lever beam units of the car retarder of the present invention as well as the supporting means therefore, all in their normal position;

FIG. 5 is an exploded perspective view of the rail anchoring means of the present invention as shown in FIGS. 3 and 4.

As the parent application Ser. No. 857,941 referred to above is described in detail, reference may be had thereto for a detailed description of the complete car retarder unit and it is believed that it will be only necessary to give a brief description of same herein, the more detailed description to refer to the rail anchoring means to be claimed herein.

Figure 1:
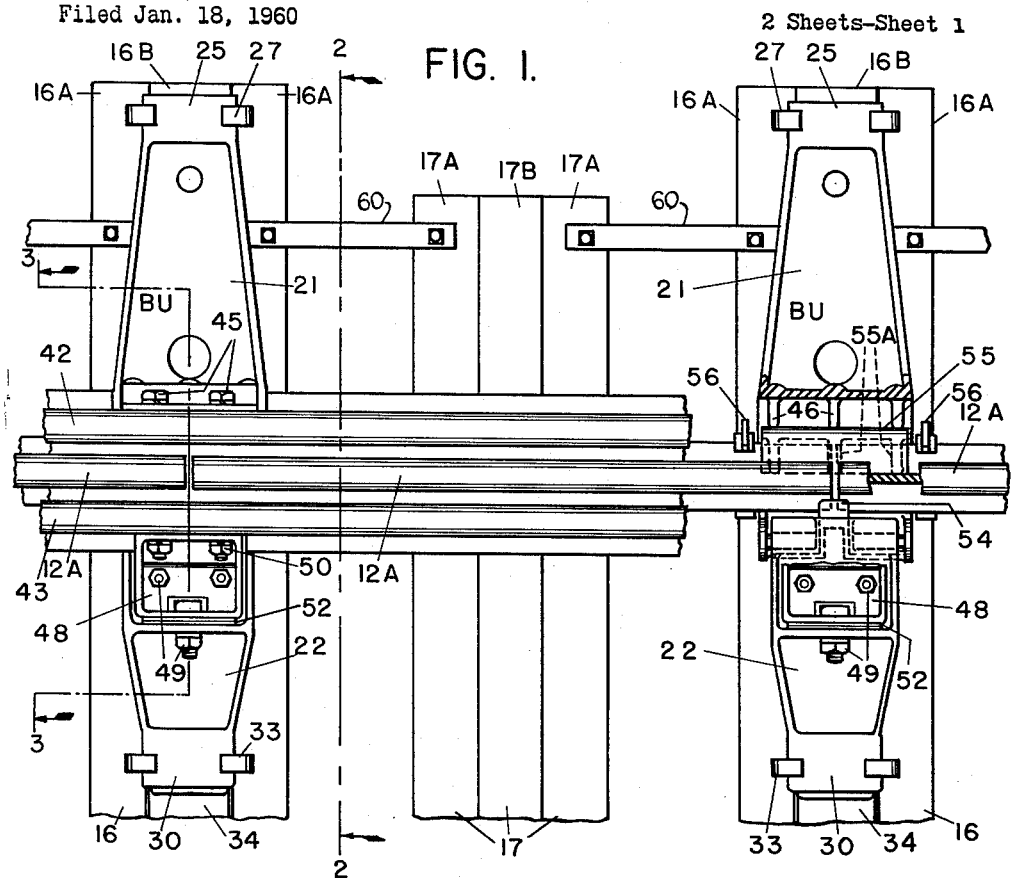
FIG. 1 is a partial top plan view of a car retarder unit of the present invention showing two lever beam sections and only one complete rail section and the ends of two other rail sections.

Referring now more particularly to FIG. 1 of the drawings, the car retarder track section has short sections of rail 12A which are mounted on the car retarder structure in a manner to form a continuous running rail as will be explained hereinafter. The car retarder structure comprises a succession of articulated toggle lever beam units BU which are disposed laterally on the cross tie structures 16 and transversely with respect to the rail sections 12A, two such lever beam units BU having been shown. As shown more particularly in FIGS. 1 and 2, the cross tie structures 16 each comprise two fully extending ties 16A lying side by side and a tie section 16B which rests on, and is fastened to, the two ties 16A. The cross tie structures 17 are located between the cross tie structures 16 and although they support the rail sections 12A at their mid sections when in a normal down position, it is not essential. The main purpose of this tie structure 17 is to support the other track rail and the guard rail of the track as shown in the above mentioned parent application, Ser. No. 857,941. Each of the cross tie structures 17 comprise two through ties 17A disposed side by side with a tie 17B resting thereon.

Each articulated toggle lever beam unit BU comprises two lever arms 21 and 22 which are pivotally jointed together at their inner ends by means of a cylindrical bearing and socket connection. The cylindrical bearing portion 23 is an integral part of the lever arm 21 whereas the socket portion 24 is an integral part of the lever arm 22.

The outer end 25 of the lever arm 21 is of rectangular cross section and is slidably mounted in an opening 26 in a supporting bracket 27. The supporting bracket 27 is mounted on the tie 16B by means of lag screws 28. Thus, in its normal position, the inner end of the lever arm 21 which carries the cylindrical bearing portion 23 of the pivotal joint will be supported by the tie 16B. A channel member 29 is interposed between the tie 16B and the lever arm 21 to provide a solid resting block.

The outer end 30 of the lever arm 22 is also of rectangular cross section and is slidably mounted in an opening 31 in a supporting bracket 33. The supporting bracket 33 is suitably fastened to a tie plate 34 which is also mounted on the tie 16B by means of screws 35. Thus, in its normal position, the inner end of lever arm 22 which carries the socket portion 24 of the pivotal joint will be supported on the cylindrical bearing portion 23 carried by the lever arm 21.

Referring again to the car retarder lever beam units BU, each series of lever arms 21 and 22 is provided with a brake shoe or beam which in this representation of the invention are shown as ordinary track rails 42 and 43. It should be understood, however, that other types of manufactured brake shoe beams could be used if desired.

In assembly, the brake shoe rail 42 is fastened to the inner end of each of the lever arms 21 by means of bolts and nuts 45. The other brake shoe rail 43 is adjustably mounted on the inner end of the other lever arm 22 in a manner whereby the spacing between the two parallel brake shoe rails 42 and 43 may be varied to compensate for wear. In this structure, a U-shaped bracket 48 is fastened to the lever arm 22 by means of bolts and nuts 49 and the brake shoe rail 43 is fastened to the bracket 48 by means of bolts and nuts 50. Shims 52 are placed in between the lever arm 22 and the bracket 48 as required to adjust the position of the bracket 48 and normally regulate the spacing between the brake shoe rails 42 and 43, and also permit readjustment as wear of the brake shoe rails 42 and 43 occurs.

Figure 4:
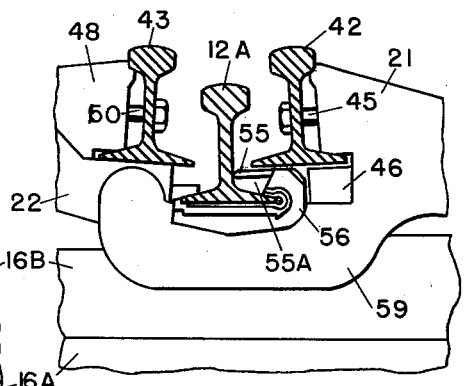
FIG. 4 is an end sectional view showing the anchoring means for the running rail of the car retarder of the present invention, with respect to endwise movement.

The short rail sections 12A on which the car wheels travel extend from the center of one lever beam unit BU to the center of the next adjacent lever beam unit BU. Each rail section 12A has its end portions bearing on a flat ledge portion 53 (see FIG. 5) of the lever arms 21 and is held in position against any appreciable transverse movement by means of a hook shaped lug 54 on the lever arm 21 and an angle shaped wedge 55 which is slid into place between the web of the rail 12A and the side edges of spacing ribs 46 formed on the lever arm 21. As shown in FIGS. 1 and 4, longitudinal movement of the short rail sections 12A and the wedges 55 is prevented by means of rail anchors 56 which are fastened to the ends of each rail section 12A and bear against the sides of their respective lever beam units BU. These rail anchors 56 and their location with respect to the ends of the rail sections 12A and the lever beam units BU is shown in the broken away portion of FIG. 1 and in FIG. 5.

Figure 3:
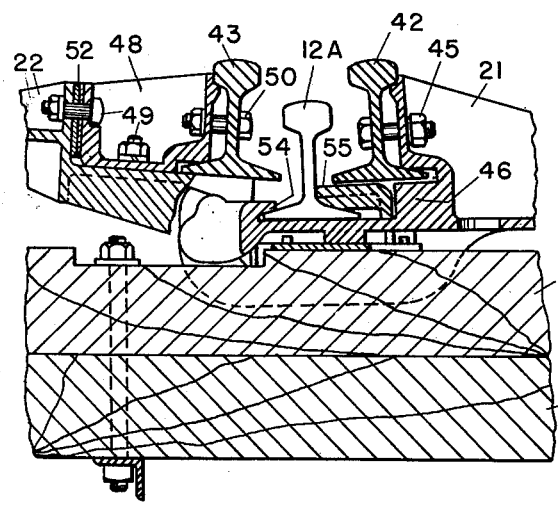
FIG. 3 is a view similar to FIG. 2 except that it shows the articulated lever beam unit and the manner in which the running rail is wedged and held therein with respect to transverse movement and is viewed as taken on the line 3—3 of FIG. 1.

With further reference to the detailed structure of the means for securing the rail sections 12A to the lever beam units BU, as previously mentioned these rail sections 12A are secured entirely to the outside lever arms 21. As shown in the drawings (see FIGS. 1 and 5), only one lug 54 has been provided, the foot portions of adjacent ends of two adjoining rail sections 12A lying thereunder, and held thereunder by means of the angle shaped wedge 55. This angle shaped wedge 55, when slid into position, has a tendency to bear on one side and the bottom against the web and foot of the rail sections 12A (see FIG. 3). Ribs 55A are provided thereon to fit the contour of the rail 12A. The other flat side of the angle shaped wedge 55 is positioned next to the edge of the ribs 46, whereas the top of the wedge 55 lies directly under the brake shoe rail 42.

In this respect, it should be mentioned that the main purpose of the wedge 55 is to provide a means for holding the rail section 12A in an upright position. This holding means cannot be too rigid as it is necessary that each rail section 12A must move upward at one end when a car begins to pass thereover, the other end of the rail section 12A acting as a pivot. Furthermore, the wheels of a truck on a certain car may vary in width. This causes a variation in the spread of the brake shoe rails 42 and 43 and consequently a variation in the amount of lift in the opposite end portions of the rail sections 12A, thus causing the rail sections to assume an elevational articulated position which is not on a true horizontal plane. Consequently, the holding means for the ends of each rail section 12A must be fairly flexible to permit a hinging action, yet be rigid enough to hold the rail in an upright position. Therefore, as shown somewhat exaggerated on the drawings, a clearance is provided between the top of the wedge 55 and the bottom of the brake shoe rail 42, also between the right side of the wedge 55 and the ribs 46, which clearance is adequate to prevent binding and permit the necessary elevational articulation.

Thus, it can be seen that each rail section is held fairly firm and upright with respect to transverse movements in their respective lever beam units BU as the left side of the foot section is wedged into the recess formed under the lug 54 whereas the right side of the foot section is held by the wedge 55. Although in the present illustration only one lug 54 and three ribs 46 and 55A have been shown in an effort to reduce weight, it should be obvious that any other number or even continuous sections could be used.

With reference to the rail anchors 56 (see FIGS. 1 and 4) which are provided to prevent endwise movement of the rail sections 12A and the wedges 55, these anchors are commercial units which are driven into place on the foot sections of each rail 12A next to the outside flange sections 59 of the lever arm 21. As these rail anchors 56 are securely clamped to both ends of the rail section 12A and bear against the outer surface of the flange sections 59, no endwise movement of the rail sections 12A within the lever beam units BU can occur. Also, the inner sides of these rail anchors 56 prevent the wedges 55 from sliding out of position.

As shown and described in the drawings and specification, particularly with reference to the means for securing the sectional portions of the running rail 12A to the articulated beam units BU, the present invention provides a car retarder of the inert type which is sectional in structure and also provides a simple and positive means for anchoring the sectional portions of the running rail thereto. Assembly and disassembly is readily accomplished yet the securing means prevents any appreciable transverse and endwise movements of the sectional portions of the running rails while in service. Furthermore, although all the interrelated parts are securely attached to each other, the necessary flexible characteristics of an inert car retarder of this type are not hindered in the least.

It will be readily apparent from the structure of the embodiment of the present invention as described that with the end 30 of the lever 22 of each of the lever beam units BU resting on an associated support bracket 33 as shown in FIG. 2, the lever beam units BU are conditioned with no car present in the retarder so that the levers are in a normally collapsed position wherein the inner ends of the lever arms 21 and 22 rest directly on the channel members 29 of the tie bed structure, and the outer ends of the lever arms 21 and 22 rest on their respective support brackets 27 and 33. As the outer ends of these lever arms 21 and 22 are slidably mounted in their respective supporting brackets 27 and 33, it will be readily apparent that the complete car retarder unit is permitted a slight transverse movement in either direction with respect to the opposite running rail of the stretch of track in which the retarder is disposed. This movement is limited by the stop ribs 57 and 58 which are located on the lower side of the lever arm 21 as shown in FIG. 2 and positioned on either side of the channel member 29. Lateral movement of the lever beam units BU is prevented by means of the downwardly extending ribs 59 on the lever arms 21, these ribs 59 overlapping the ends of the channel members 29 and the sides of the ties 16B. The various tie structures 16 and 17 are held in properly spaced position by means of spacer bearings 60 connecting the ties and suitably secured thereto at a point outside of the track rails.

The transverse movement of the lever beam units BU is permitted to compensate for a variation in the overall width of the car wheel axles. In operation, when a car wheel truck enters the car retarder, the rail (not shown) opposite the rail 12A which is associated with the car retarder, together with a suitable guard rail (not shown) will position the wheel and its flange so as to guide the passage of the car through the retarder. The other wheel and flange of each axle will enter between the brake shoes 42 and 43 and position the rail 12A and its associated lever beam units BU transversely as required in accordance with the gauge of the wheels.

Assuming that a moving car is about to enter the car retarder, the wheel spreads the brake shoes 42 and 43 apart to accommodate its width. This action causes the complete lever beam unit BU to pivot at its articulated ball and socket joints and rise from the tie bed until the proper separation between the brake shoes 42 and 43 is attained, the outer ends of the levers 21 and 22 merely pulling inwardly on their slidable mountings in the brackets 27 and 33. The weight of the car applied on the track rail 12A attempts to collapse the articulated unit BU and thereby the weight applied to the rail 12A is converted into braking pressure applied laterally to the sides of the car wheels by the brake shoes 42 and 43. This is in accordance with well known principles of operation of weight-automatic car retarders wherein the braking pressure applied to the car wheels is proportional to the weight applied on the track rail within the retarder. It will be noted that the wheel of a car when within the retarder causes the lever 21 always to be spaced above the channel 29, and that the distance the lever 21 is above the channel 29 is determined by the width of the car wheel. The braking pressure applied in accordance with the weight of the car is effective irrespective of the spacing between the channel 29 and the lever 21 as long as the unit BU is effective to maintain the lever 21 above the channel 29.

Having shown and described one particular form which the present invention can assume, it is desired to be understood that various other forms, adaptations, alterations and modifications may be applied to the specific form shown to meet the requirements of practice except as limited by the scope of the following claims.

What we claim is:

1. A car retarder of the weight-automatic type comprising oppositely disposed brake actuating lever supporting a section of track rail, said levers being disposed normal to the track rail and being supported at their outer ends, at least one of the outer ends being supported by a sliding connection with railway ties, and said levers being pivotally connected at their inner ends, oppositely disposed brake beams secured to the respective levers along both sides of the track rail for bearing against the sides of car wheels passing over the rail to an extent dependent upon the pressure applied by the weight of a car on the track rail, and means for securing the rail to a particular one of said levers including a stop on said particular lever at one side of the track rail and a wedge between the other side of the track rail and a portion of said particular lever, and means secured to the track rail at the ends of the wedge for permitting only limited axial movement of said wedge.

2. A car retarder according to claim 1 wherein said stop is integral with said particular lever.

3. A car retarder according to claim 1 wherein said wedge fits loosely to permit elevational articulation of the track rail upon passage of a car through the retarder.

4. A car retarder according to claim 1 wherein the means for permitting only limited axial movement of said wedge is in the form of rail anchors applied to the track rail near the ends of said wedge respectively.

5. A car retarder according to claim 1 wherein one of the brake beams extends over said wedge.

6. A car retarder according to claim 1 wherein said wedge has its longitudinal axis substantially parallel to the longitudinal axis of the track rail.

7. A car retarder according to claim 4 wherein at least one of the rail anchors is effective to prevent axial movement of the rail on said particular lever.

8. A car retarder according to claim 6 wherein said wedge is strengthened by at least one transverse rib.

9. A car retarder according to claim 8 wherein there is a longitudinal rib along one side of said wedge.

References Cited in the file of this patent

UNITED STATES PATENTS

| | | |
|---|---|---|
| 1,627,137 | Barr | May 3, 1927 |
| 1,947,354 | Mullen | Feb. 13, 1934 |
| 2,285,327 | Brown | June 2, 1942 |
| 2,815,097 | Marsh | Dec. 3, 1957 |

FOREIGN PATENTS

| | | |
|---|---|---|
| 266,715 | Great Britain | May 26, 1927 |